COMMUNICATION SWITCHING SYSTEM EMPLOYING GAS TUBES

Filed March 25, 1955 5 Sheets-Sheet 1

INVENTOR
R. W. KETCHLEDGE
BY James W. Falk
ATTORNEY

COMMUNICATION SWITCHING SYSTEM EMPLOYING GAS TUBES

Filed March 25, 1955 5 Sheets-Sheet 2

INVENTOR
R. W. KETCHLEDGE
BY
[signature]
ATTORNEY

COMMUNICATION SWITCHING SYSTEM EMPLOYING GAS TUBES

Filed March 25, 1955 5 Sheets-Sheet 3

INVENTOR
R. W. KETCHLEDGE
BY
ATTORNEY

Jan. 29, 1957 R. W. KETCHLEDGE 2,779,822

COMMUNICATION SWITCHING SYSTEM EMPLOYING GAS TUBES

Filed March 25, 1955

5 Sheets-Sheet 4

INVENTOR
R. W. KETCHLEDGE
BY
[signature]
ATTORNEY

COMMUNICATION SWITCHING SYSTEM EMPLOYING GAS TUBES

Filed March 25, 1955 5 Sheets-Sheet 5

INVENTOR
R. W. KETCHLEDGE
BY Jouns D. Falk
ATTORNEY

United States Patent Office 2,779,822

Patented Jan. 29, 1957

2,779,822

COMMUNICATION SWITCHING SYSTEM EMPLOYING GAS TUBES

Raymond W. Ketchledge, Whippany, N. J., assignor to Bell Telephone Laboratories, Incorporated, New York, N. Y., a corporation of New York Application March 25, 1955, Serial No. 496,749

20 Claims. (Cl. 179—18)

This invention relates to selective switching networks and more particularly to such networks for telephone switching systems employing cold cathode gaseous discharge devices.

In Patent 2,684,405, issued July 20, 1954, of E. Bruce and H. M. Straube, there is described a selective switching network comprising a number of stages of gas tubes connected to define a plurality of individual paths between any one of a number of inputs, which may be subscribers' telephone lines, and any one of a number of outputs, which may be interoffice or intraoffice trunks. One of these possible paths is broken down by the application of potentials at the terminals of the path and within the network itself. Each gas tube within the network defines a crosspoint between two nodes of the network; accordingly there may be a number of crosspoint tubes connected to any one node, some of these tubes having their anodes and some their cathodes connected to the nodes. The switching network is thus generally described by these two terms, nodes and crosspoints, and they shall be referred to in the subsequent presentation of this invention.

When a talking path is to be established through the network the marking potentials are applied to the terminals of that path and to each node in the network; the potential is applied to each node through a lockout resistance. The potential between the line terminal and the first node, and thus across the first crosspoint tube, is sufficient to break down that tube; the voltage across the tube will then drop to a sustaining value and a marking or ionizing current will flow through the tube between the line terminal and the node potential source. The next cross point tubes connected to that node will then be broken down and each will have an ionizing or marking current flowing through them from the next node potential source and through the first crosspoint tube to the line terminal.

There therefore exists, in switching systems of this type as described in the patent, a limitation on the number of stages of gas tube crosspoints which can be employed in the network. This limitation results from the fact that current flows through the terminal marking source, and thus through a lockout impedance associated with it, to maintain marked or ionized each of the marked gas tubes in the network. The current required to mark or maintain ionized a single gas discharge device or crosspoint in the network is small. However, before the final talking path is established, many possible alternate paths are ionized, the paths fanning out from the initiating terminal and from each marked node in the network; this causes a high "fanout" current to flow through the terminal. For example, if each node of the network connects ten crosspoint tubes in each direction, the marking or ionizing current through the terminal of a four-stage switching network can attain a value 100 times the marking current for an individual crosspoint. In a six-stage ten crosspoint switching network, the terminal ionizing current may reach a value 1000 times that of the individual marking currents. This fanout current flowing through the high-valued lockout impedance causes a large potential drop which diminishes the potential available at the terminals to maintain the crosspoints ionized. If the terminal potential is decreased below the sustaining value required for the series connected gas discharge devices, they will be extinguished. Accordingly, this condition decreases the margins of potentials available for proper operation as well as being a severe limitation on the size of the network.

Tubes of the type employable in these switching networks break down at a low value of current and immediately go through an unstable negative resistance region to a considerably higher value of ionizing current at the sustaining voltage of the tube. Thus the tube may break down with a current of the order of one microampere but immediately go to a sustaining condition with an ionizing current of the order of tenths of milliamperes. While this ionizing or marking current is still considerably less than the current through the tube when the talking path has been established, which may be of the order of tens of milliamperes, it is still too high for the employment of a large number of stages in a single network, for the reasons set forth above. Advantageously, when the talking path is established and the other or alternate crosspoint tubes extinguished, due to the lockout resistances connected to the nodes, the node marking potentials are removed. Also advantageously, the crosspoint discharge devices are of the type described in application Serial No. 169,121, filed June 6, 1950, of M. A. Townsend, which have a stable and usable negative resistance characteristic for the value of current employed in the talking path.

It is an object of this invention to provide an improved switching network employing gaseous discharge devices.

It is a further object of this invention to increase the number of stages of gas discharge devices that may be employed in such networks. Thus it is an object of this invention to eliminate the limitation on the number of stages priorly imposed by the fanout of ionizing current from the marked terminal of the network.

It is another object of this invention to enable the gaseous discharge devices of a switching network to remain in an ionized or marked condition at the sustaining voltage of the device but with a current therethrough less than that required to maintain ionization in the device at the sustaining voltage.

These and other objects of this invention are attained by not requiring the direct current flowing from the marked terminal to maintain ionization in each of the marked tubes of the network. When a crosspoint breaks down, a direct current marking voltage is applied to the next node of the network. In accordance with an aspect of this invention, a source of alternating current is connected to that node by this direct current marking signal. The alternating current then maintains or latches the crosspoint in an ionized condition. Accordingly, as the direct current through the tube is not required to maintain the tube ionized, it can be considerably less than that dictated by the voltage maintained across the tube. In this manner the direct current through each crosspoint tube can have a small value within the unstable region of the current voltage characteristic, below the value of sustaining voltage. Further, the voltage across the tube can be maintained at this value for this low marking current.

It is therefore apparent that in accordance with a feature of this invention the marking current, which is direct current and the summation of which from the marked tubes must flow through the marked terminal, is now separated from the sustaining current, which is an alternating current distinct for each tube.

The alternating voltages applied at the nodes of the network maintain the ionization in the tubes if the period of the voltage is less than twice the deionization time of the gas employed in the tube. Under this condition, a voltage sufficient to maintain an ionizing discharge in the tube will always be applied to the tube before the gas can deionize. For example, the deionization time of a typical tube of the construction disclosed in the above-mentioned Townsend application is of the order of a fraction of one millisecond. If a 10 volt electromotive force of a frequency of 100 kilocycles is applied across this type tube, the tube will remain ionized under an applied direct current voltage of 115 volts with a direct current of 10 microamperes. Other combinations of direct current voltages and alternating current electromotive forces for latching the ionized gas discharge devices may, of course, be employed. For example, the applied direct current voltage may be decreased and the alternating electromotive force may be increased to a value such that the peak-to-peak value of the electromotive force exceeds the applied direct current potential. The alternating current circuit in the latter example utilizes the actual cathode of the tube as alternatively the cathode and anode of the ionizing discharge. The alternating current may be applied to the nodes in response to the direct current marking potential or it may be connected to the nodes at all times. This latter arrangement, however, causes a reduction in the margin of operating voltages.

In one specific embodiment of this invention, a single alternating current source is employed to supply the latching potential to all of the nodes. This is accomplished by connecting one side of the alternating generator through individual gas tubes to a first alternate group of nodes and connecting the other alternate group of nodes to the grounded side of the generator through condensers.

In another embodiment, a single generator having several output phases is employed. Different phases are applied to successive nodes through transformers and individual gas tubes connected to each node. The same phase may be applied to alternate nodes thereby requiring only two phases regardless of the number of stages in the network. High values of lockout resistances may be utilized at each node to limit the direct marking current to a low value, as of the order of only 10 microamperes; while this value of current is in the unstable region of the tube's characteristic, there will be no tendency for the tube to require a higher direct current to maintain ionization as this is accomplished by the alternating current through the tube.

Another embodiment of this invention employs oscillators connected to successive nodes in the gas crosspoint switching network to supply both the direct and alternating current voltages to the nodes. Direct current is applied to the nodes through the oscillator tube acting as a conducting path for the marking voltage. In response to the application of this marking voltage, oscillations are generated which are fed through the tube to the nodes to maintain or sustain the gas discharge devices in their ionized condition.

Another embodiment of this invention employs a crosspoint marking and holding circuit comprising a gas discharge device connected between an individual alternating current source and each of the nodes. Alternating current is then applied to successive nodes at different frequencies or different phases to obtain the latching potential. The marking pulses applied to the nodes are also applied through a condenser as an ionizing pulse to the gas discharge device connected between the alternating current source and the condenser. Ionization of this gas discharge device completes the path between the alternating current generator and the node.

Still another embodiment of this invention employs a crosspoint marking and holding circuit comprising relays connected to the nodes which relays are actuated by the application of direct current to the nodes. Upon actuation of the relays, an alternating current circuit is closed to apply sustaining potential to the nodes.

It is a feature of this invention that the gaseous discharge devices defining crosspoints in a communication switching network be broken down by the application thereto of a direct current marking potential but be maintained in an ionized and conducting condition by alternating current applied across each device.

It is a further feature of this invention that a gaseous discharge device in a switching network be maintained at its sustaining voltage with less direct current therethrough than required by its direct current voltage characteristic to maintain the device ionized; ionization being maintained by alternating current applied to the device.

It is another feature of this invention that the period of the alternating current applied to the device to maintain the device ionized be less than twice the deionization time of the gas employed in the device, whereby ionization is maintained in the device between successive alternating discharges.

It is still another feature of this invention that the alternating current be applied to each device individually so that each device is included in its own alternating current circuit, whereby the alternating current applied to one device is ineffective on a device defining a crosspoint in a neighboring stage in the switching network. More specifically, it is a feature of this invention that the gaseous discharge device electrodes alternatively function as anode and cathode in this circuit, even though one of the electrodes may be specifically designed and formed to function as the cathode in the direct current path through the network and the other as the anode of the discharge in that path.

It is a further feature of this invention to operate the gas discharge devices of the crosspoints in the 10 to 100 microampere region at a potential below that at which ionization normally exists.

It is a feature of one embodiment of this invention to ionize the crosspoints with a direct current and maintain them in a latched or ionized condition by the application of alternating currents of different frequencies applied to successive nodes.

It is a feature of another embodiment of this invention to employ a latching generator supplying different phases of alternating current to successive nodes.

It is a feature of another embodiment of this invention to employ a single generator to latch all of the crosspoints in a marked condition by the application of the electromotive force directly to alternate nodes of the crosspoint switch while grounding second alternate nodes through condensers to the other side of the generator.

The foregoing and other objects and features of this invention may readily be understood from the following description when read with reference to the accompanying drawing in which.

Figure 1:
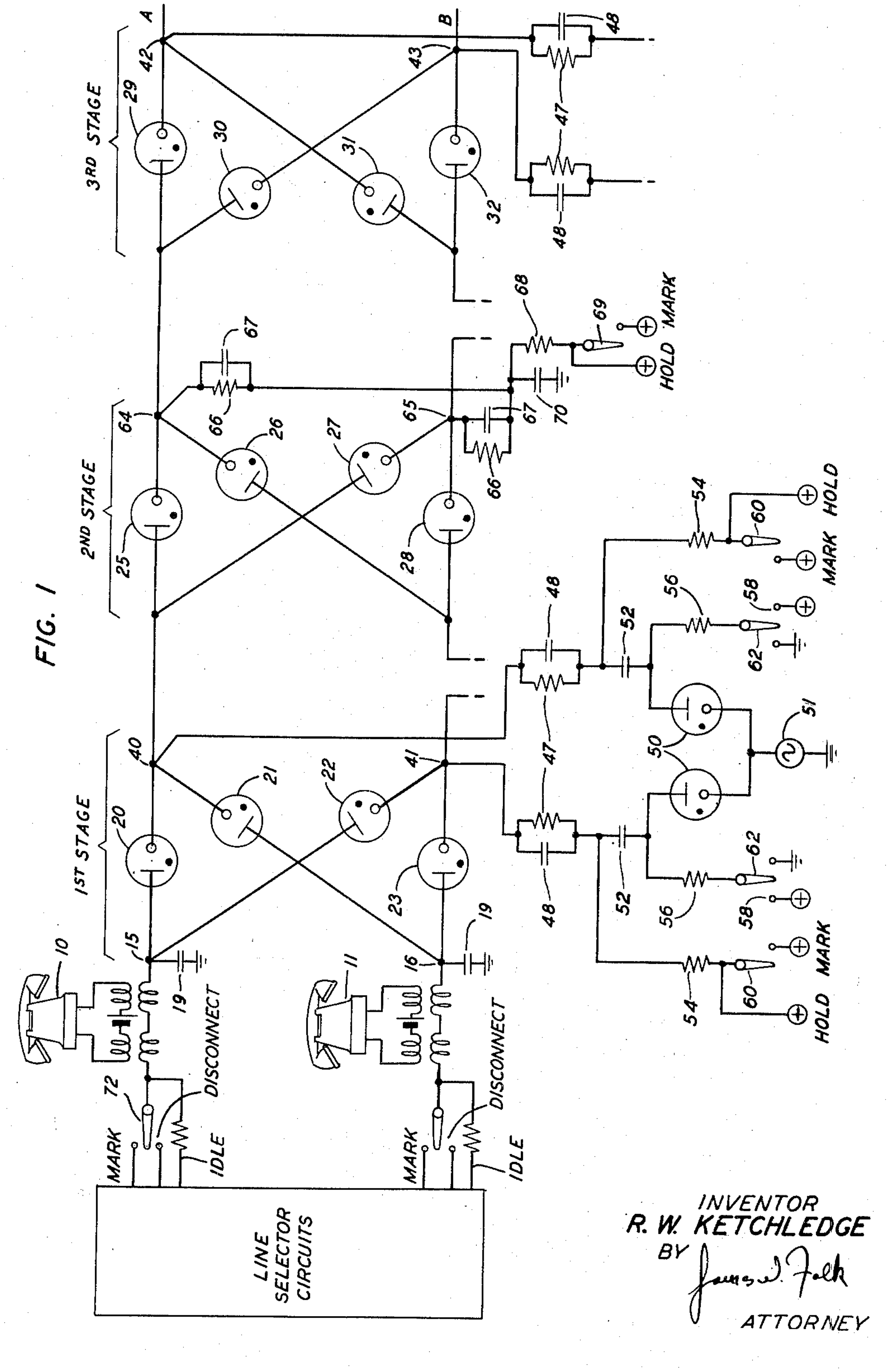
Figs. 1 and 2 show in combined block and schematic form a communication switching network illustrative of one embodiment of the present invention.
Figure 2:
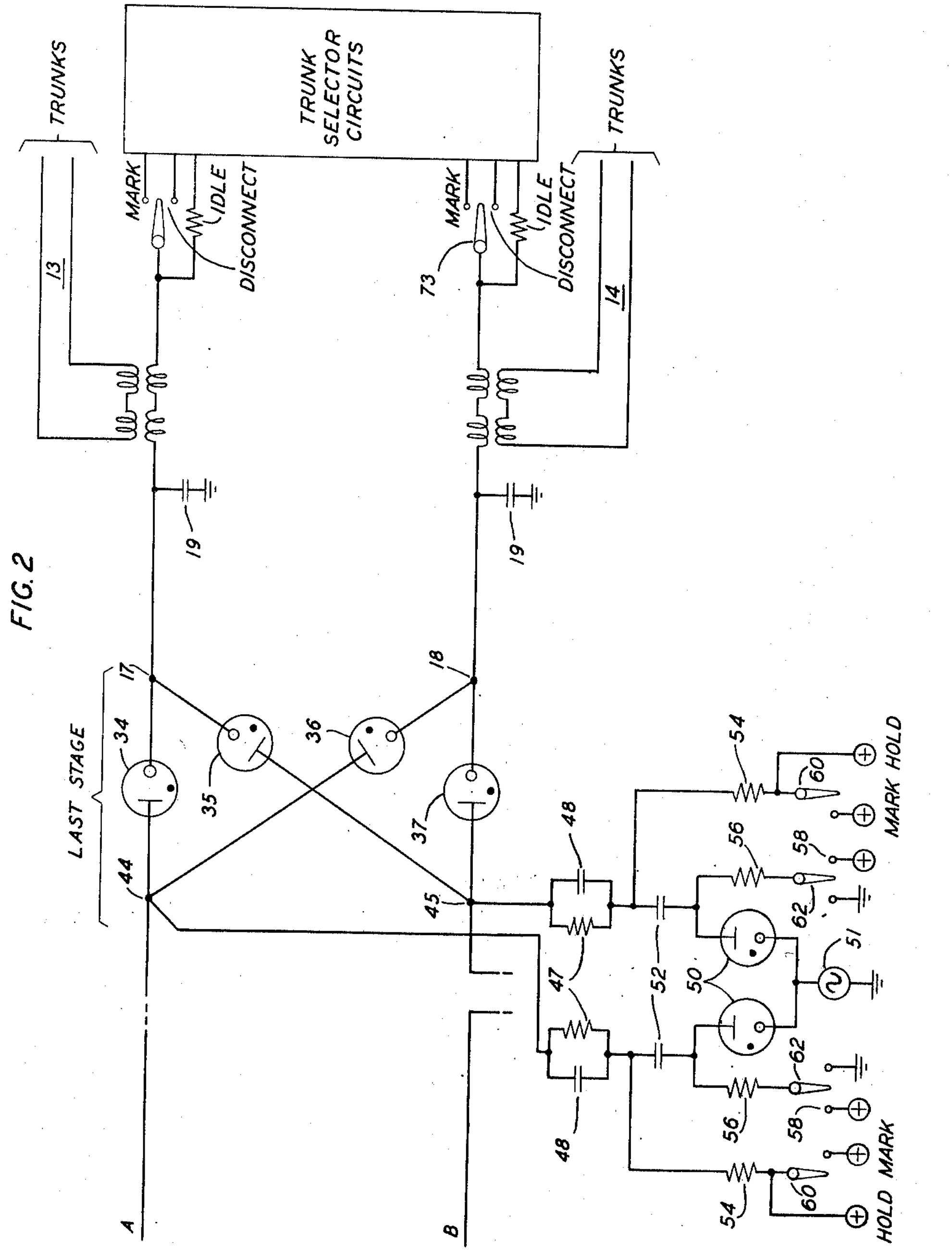

One embodiment of a telephone crosspoint switching network in accordance with this invention is depicted in Figs. 1 and 2 placed side by side so that lines A—A and B—B of the two figures coincide. Telephones 10 and 11 represent a large number of individual subscriber sets which may be connected by any of a number of talking paths through the network to any one of a number of trunks, of which only two trunks 13 and 14 are indicated in Fig. 2. The line and trunk selector circuits represented in block diagram form constitute the sources of mark, idle and disconnect voltages for terminals 15, 16, 17, 18 of the crosspoint switching network and may be as described in Patent 2,684,405, issued July 20, 1954, of E. Bruce and H. M. Straube. A bypass condenser 19 advantageously connects each of these terminals to ground.

Gas diodes 20, 21, 22, and 23 are included in the first of several stages of the switching network, gas diodes 25, 26, 27, or 28 in the second stage, gas diodes 29, 30, 31, and 32 in the third stage, and gas diodes 34, 35, 36, and 37 in the last stage. While only the first, second, third, and last stages of the network are depicted in Figs. 1 and 2, it is to be understood that any number of intermediate stages may be used in accordance with an aspect of this invention as there is no fanout problem to limit the number of stages. Similarly, it is to be understood that each stage may include a large number of diodes defining a multitude of paths through that stage, only these few diodes in each stage being illustrated for purposes of explaining the principles of this invention. Further, it is to be understood that the gaseous discharge devices need not be diodes but may include starter electrodes, as set forth in my application Serial No. 426,337, filed April 29, 1954, or be other types of gaseous discharge devices known in the art.

Accordingly it is to be understood that there may be a large number of telephones and line terminals connected through the network to a large number of trunks and trunk terminals, each stage including additional diodes interconnected as indicated by the dashed lines. Similarly, additional of the various circuit elements indicated as being individual to each node in the network would be provided as required.

To each of the nodes of the first group of alternate stages of the switching network, of which only nodes 40, 41, 42, 43, 44, and 45 are indicated in Figs. 1 and 2, there is connected a parallel network comprising a resistor 47 and a condenser 48 through which are to be applied the direct current marking and alternating current latching voltages respectively. At the nodes of alternate stages a resistor 54 is connected between a marking control switch 60 and the node to complete the direct current path. A condenser 52 and gas tube 50 complete the alternating current path for an alternating current generator 51. A switch 62 is employed to complete the circuit to the sustaining potential 58 for tube 50 through a resistor 56. Advantageously there is a separate marking circuit and latching control circuit for each node of the stage; thus each of the elements 47, 48, 50, 52, 54, 56, 60, and 62 is individual to each node though the generator 51 may be common to all nodes of a given stage or, in fact as further discussed below, common to all nodes of alternate stages. In the embodiment depicted only two sets of marking and latching control circuits are shown for the nodes 40, 41 of the first stage and for the nodes 44, 45 of the last stage. Similar circuitry would be provided for each of the other nodes of these stages as well as the nodes of the other alternate stages, such as nodes 42, 43 of the third stage. Further, each of the switches 60 and each of the switches 62 at any stage may advantageously be mechanically ganged together, if mechanical switching means are employed, or electrically operated simultaneously, if electrical switching means are employed, so that marking potentials are applied to all the nodes of a stage at the same time. Alternatively a single switch 60 and marking source may be utilized for all the nodes of a single stage.

The nodes of the other alternate stages, such as nodes 64, 65 of the second stage of the switching network, are connected through individual lockout resistors 66 having bypass condensers 67 thereacross to a common resistor 68 and a single switch 69 to apply the direct current marking potential to these nodes. A condenser 70 provides the return path to ground for the alternating latching currents from the generator 51. A single switching element 69 is advantageously employed for all the nodes of the stage, the resistances 66 providing the requisite lockout between nodes.

Let us assume for the purposes of illustration of the operation that no communications paths are established and a call is to be made from telephone 10 to trunk 14. After the handset is removed from telephone 10, switches 72 and 73, which connect the terminals 15 and 18 to the line and trunk selector circuits, respectively, and the various switches 60, 62, and 69 are closed to their mark position manually, electronically or electrically. This applies marking potentials to the crosspoint network at terminal 15 and terminal 18 as well as all of the nodes. When marking current reaches a node, due to the breakdown of a crosspoint connected to that node, the shift in marking voltage is applied through condenser 52 to tube 50. Tube 50 is fired by this surge and held at a sustain value by the battery 58 supplied to the tube through resistor 56. The alternating current source is thereby connected to the node through condenser 52 and the alternating current bias or latching current is superimposed on the node. The alternating current path is completed through the crosspoints and to the grounded terminal of the generator through condensers 67 and 70. When this occurs the crosspoint which is broken down to that node remains in an ionized condition due to the alternating current latching voltage, i. e., due to the discharges periodically established in the crosspoint between the electrodes thereof. The marking current is thus assured a low resistance conduction path through the crosspoint to the node so that it can mark and effect breakdown of all the crosspoint devices connected to that next node which are not also connected into a busy path. The marking current is not required itself to sustain the discharge in the tube or to maintain the tube in an ionized condition. Accordingly, the marking current may be very small and the voltage across the tube still be at the sustaining potential, the voltage across the tube and the current being determined by the marking potential applied to that node, the marking potential applied to the line terminal, and the various resistances and impedances in the path thus defined.

In this manner the marking current can be considered to advance through each stage of the switching network in succession, breaking down successive crosspoint devices, until a crosspoint device is broken down to the marked trunk terminal. Up to this instant, the direct current flowing in each marked tube has been from the marking potential sources connected, by the switches 60, to the nodes to the line marking source and no lockout has occurred between the various tubes; the direct current is a very low value. However, when a gas tube connected to the marked terminal is broken down, a path is established through the network and the crosspoints in this path will immediately shift to their high current conduction state and specifically, in one specific embodiment of this invention to the high current requisite to operate each tube at the stable negative resistance portion of its current voltage characteristic, as set forth in application Serial No. 169,121, filed June 6, 1950, of M. A. Townsend. Momentarily all of the marked gas discharge crosspoints will remain ionized but, due to the high values of lockout impedances at the terminals, only that current is permitted which will sustain one series of crosspoints, for example, that including tubes 20, 25, 29, and 36. Under this condition, all of the alternate paths are extinguished.

After the call is completed, switches 72 and 73 are moved to their disconnect position and switches 60, 62, and 69 opened. Switch 62 has now disconnected the sustain potential from tube 50 causing this tube to deionize thereby opening the circuit between the generator 51 and the several nodes. Switches 72 and 73 have removed the mark potential formerly applied to terminals 15 and 18. The several crosspoints are now deionized, and the crosspoint switch is restored to a condition in which it is ready to receive or initiate additional calls.

Alternatively, the marking and latching potentials may be removed from the interior nodes of the network by opening the switches 60, 62, and 69 after the talking path has been set up through the network but before the call is completed. This has the advantage of preventing these applied potentials interfering with the nonoperate margins of other tubes, i. e., the voltage difference available between the voltage at a given node due to a crosspoint being broken down to that node and the voltage requisite at that node to effect breakdown of another tube connected to that node. As another alternative, switches 60 and 69 may be opened upon establishment of the talking path and switch 62 opened upon completion of the call. Since the latching frequency is above the voice frequency band, there will be no interference with the speech transmission.

It is to be understood, of course, that while the establishment of only a single talking path through the switching network has been described, there will normally be a number of paths simultaneously existing through the network between the subscriber telephones, such as 10 and 11, and the trunks, such as 13 and 14. Due to the lockout aspects of this type of switching network, these paths will be distinct and the establishement of another path through the switching network, due to the marking and latching currents as described above and in accordance with this invention, will not interfere with priorly established paths through the network.

Figure 3:
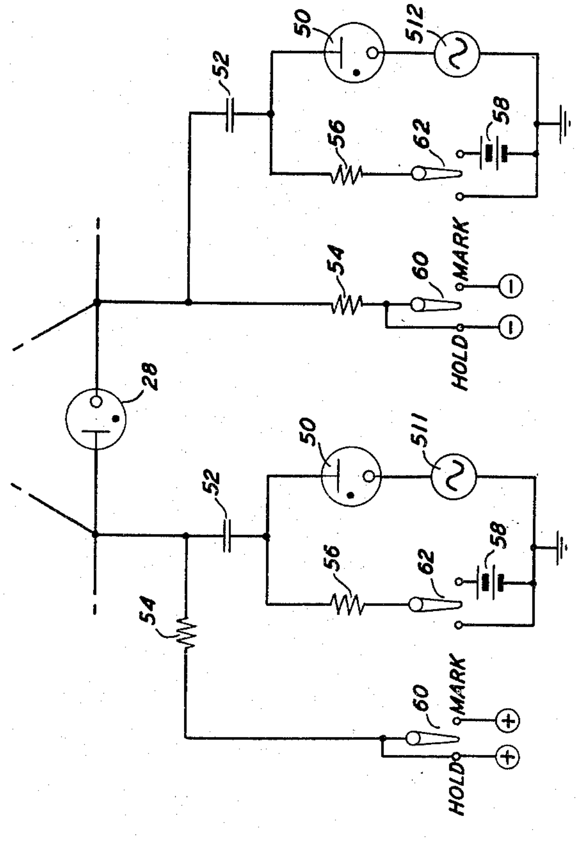

Fig. 3 shows an alternative embodiment of the marking and latching circuit consisting of generators 511 and 512 connected to the nodes through gas diodes 50 and condensers 52, only one crosspoint, tube 28, and two nodes being depicted in the figure. A marking pulse is supplied through switch 60 and resistor 54 to the nodes. Switch 62 controls the sustain potential applied to the gas discharge tube 50 through resistor 56. Each of the circuit elements except the alternating current generators 511 and 512 is individual to a particular node, except that a single direct current voltage supply and switch 60 may be employed for all the nodes of a particular stage.

The operation of the marking circuit of Fig. 3 is fundamentally similar to the oscillator circuit disclosed in Figs. 1 and 2 in that the same two functions are accomplished, similar elements being referred to by the source reference numeral. First, a direct current potential is applied to all nodes and second, in response to crosspoint breakdown, an alternating current voltage is applied to the particular nodes to which breakdown has occurred. When switches 60 and 62 are moved to their mark position either manually or electrically or the circuit otherwise closed electronically, the source of marking potential is applied through each switch 60 and resistor 54 to a particular node. Breakdown of crosspoints occurs between the marked end terminals, such as terminals 15 and 18 in Figs. 1 and 2, and adjacent interior idle nodes, such as nodes 40, 41 and nodes 44, 45 in Figs. 1 and 2, since breakdown of a crosspoint requires marks of opposite polarity on opposite sides. Operation of the first and last stages is followed by operation of the intermediate stages as described by Bruce and Straube in Patent 2,684,405. In response to the shift in direct current potential when breakdown occurs to a node, a pulse is transmitted through condenser 52 to the gas discharge device 50 for that node, which device is maintained at a sustain potential by the application of a direct current potential from battery 58 through switch 62 and resistor 56. This pulse is of sufficient magnitude to cause ionization of tube 50, thereby establishing an alternating current path between generator 511 or 512 and the node through condenser 52. Upon the termination of the communications, switches 60 and 62 are moved to their idle position in a manner similar to that of switches 60, 62, and 69 in Figs. 1 and 2. The removal of the sustain potential from tube 50 causes it to become deionized and the system is again ready to establish another call.

Generators 511 and 512 represent different alternating current sources coupled to successive nodes of a crosspoint switching network. These may be generators of different frequency or, alternatively, they may be different output phases of a common generator. Using the different phase or frequency arrangement, only two phases or frequencies are required, the first phase or frequency being connected to first alternate nodes and the second phase or frequency being connected to second alternate nodes.

Various other arrangements may be devised in accordance with this invention to apply alternating current from two sources to alternate nodes to latch the crosspoint switching network after it has been marked by direct current provided a fundamental requirement is met. This fundamental requirement is that a sufficient electromotive force be impressed having an effective period less than twice the deionizing time of the gas discharge devices constituting the crosspoints. Stated in another manner, the requirement is that the discharges occur repetitiously at a rate greater than the deionizing rate of the gas discharge devices of the crosspoint network. A typical frequency would be 50 kilocycles.

Figure 4:
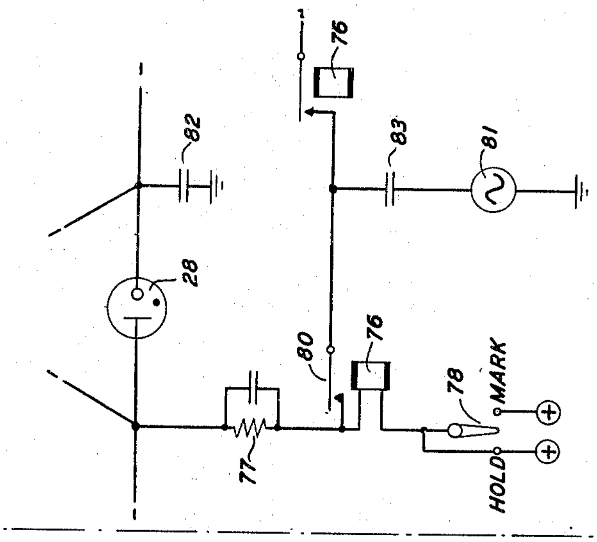
Figs. 3 and 4 are schematic diagrams of alternative node marking and latching circuits in accordance with other specific embodiments of this invention, which circuits might be substituted for the node marking and latching circuits in Figs. 1 and 2.

Fig. 4 discloses a third embodiment of the invention in which a relay 76 is connected between the source of marking potential and each node of alternate stages through a resistor 77 by the closing of a switch 78; as in Fig. 3 only one crosspoint, comprising the tube 28, and two nodes are depicted. In response to the direct current ionizing pulse from crosspoint breakdown to that particular node armature 80 is attracted to its closed position connecting the alternating current source 81 with the node through condenser 83. A separate relay 64 is required for each node of alternate stages. The alternating current voltage is applied across tube 28, for example, of the gas crosspoint switching network by means of grounded condenser 82 and the grounded return circuit of the generator. After the call is completed, this circuit is disconnected by moving switch 78 to its neutral position causing relay 76 to release thereby removing the alternating current voltage from the nodes.

Figure 5:
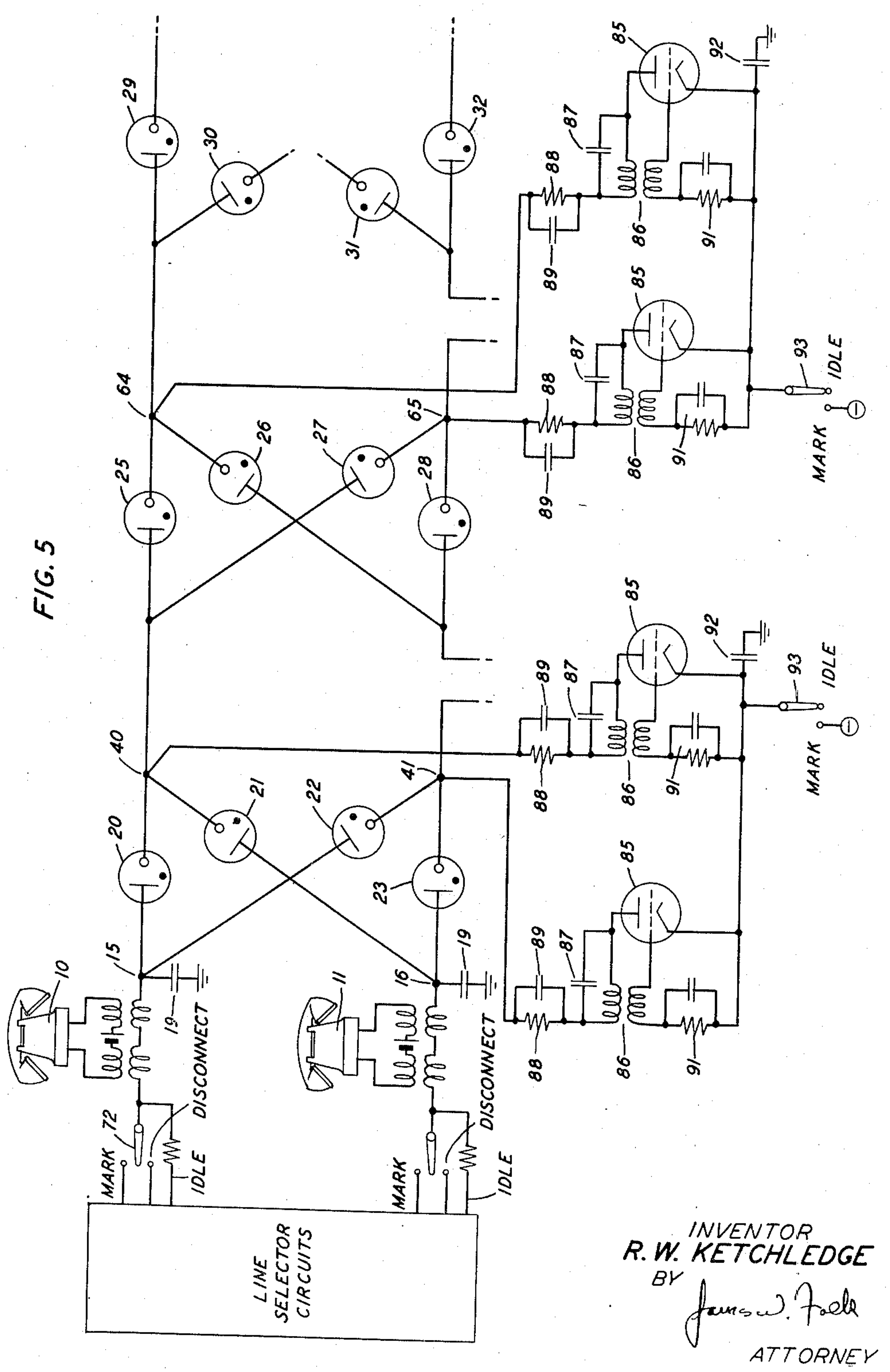
Fig. 5 is a schematic diagram of another specific embodiment of this invention.

Fig. 5 discloses another embodiment of a switching network with marking and latching circuits in accordance with this invention in which tubes 85 are oscillator tubes which generate the latching or sustaining electromotive force for application to the nodes, there being an individual oscillator tube for each node in the network in this embodiment. Transformer 86 contains a primary and secondary winding, the former of which constitutes a feedback path and the latter of which constitutes an output circuit which is tuned by the condenser 87. The several resistor 88 and condenser 89 parallel combinations constitute paths for the direct and alternating currents, respectively, between the marking source and the several nodes. Parallel connected resistor and condenser 91 constitute the grid leak circuit for the oscillator tubes. Condenser 92 represents a bypass condenser for the alternating current electromotive force applied between the nodes and ground.

When switches 93 are closed, marking potential is applied to the several nodes through the oscillator tubes 85 of which only four are shown as only two nodes are depicted between each stage and only the first and second stages are depicted. In response to the ionizing pulses transmitted to particular ones of these tubes by breakdown of crosspoints to the nodes associated with these particular tubes, oscillations are set up which in turn are applied to the nodes through condensers 89 to maintain the tubes ionized. After the call is completed, the subscribes handset is returned to the cradle of the telephone, the terminal switches moved to their disconect position, and the switches 93 opened either manually or electrically or the circuit opened electronically, thereby deionizing the previously ionized tubes.

Oscillator tubes need be connected only to alternate nodes as the latching alternating current applied to a node can maintain all the marked crosspoints connected to that node ionized, both those of the prior and those of the subsequent stage of the network. If oscillator circuits are connected to only alternate nodes, then each circuit may have the same frequency of oscillation. However, a margin of safety is provided by employing oscillator circuits connected to each node, so that the path can be established even on the failure of any one of the oscillator circuits. In such case the adjacent oscillator circuits advantageously have different frequencies of oscillation.

Figure 6:
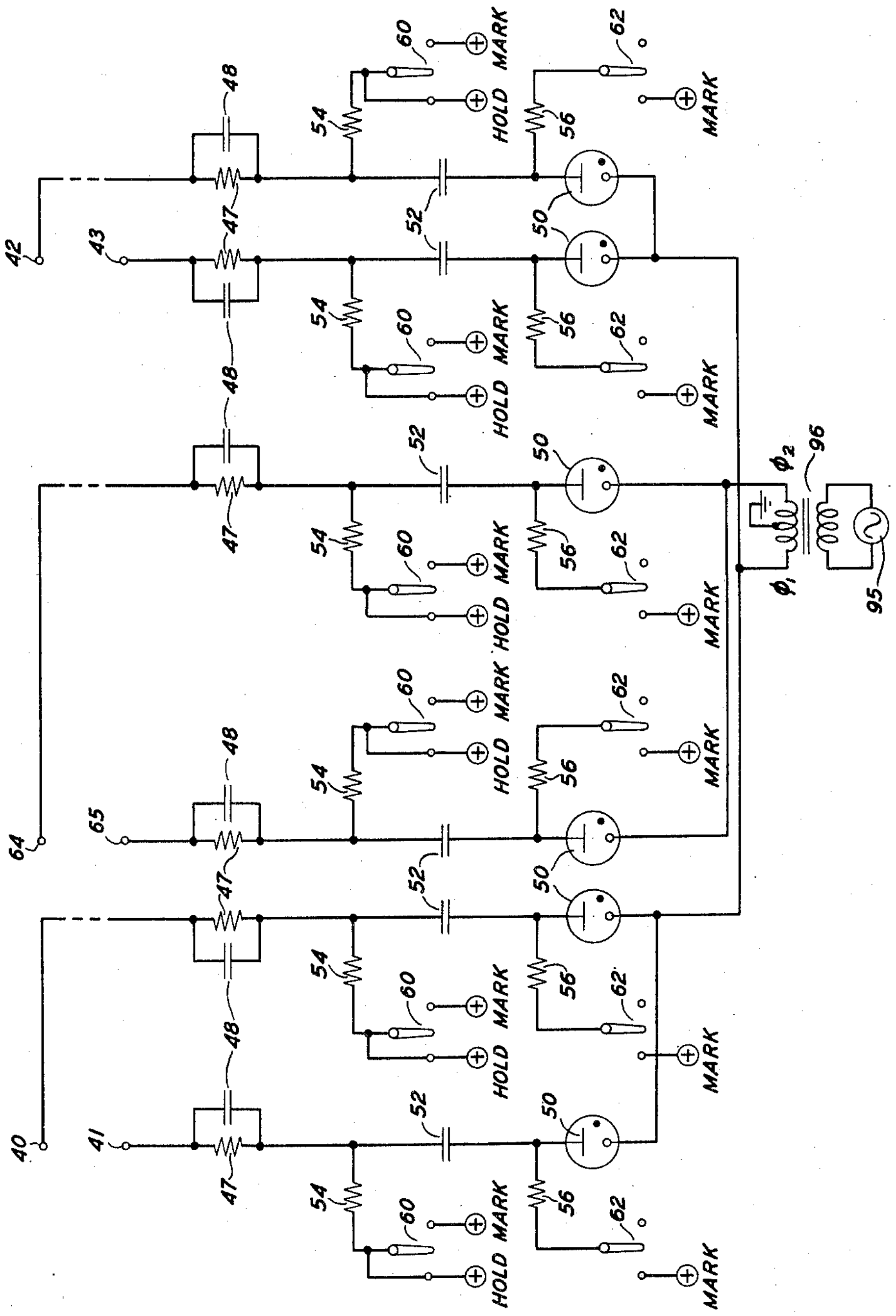
Fig. 6 is a schematic diagram of an alternative circuit in accordance with another embodiment of this invention, which circuit might be substituted for the node marking and latching circuits in Figs. 1 and 2.

Fig. 6 discloses another embodiment of the marking and latching circuit in which an alternating current generator 95 is employed to supply alternating currents of different phases to nodes of alternate stages of the switching network. In this embodiment alternating currents of different phases are applied to the nodes of successive stages. In Fig. 6 the node marking and latching circuits are depicted only, the circuits being connected to the nodes 40, 41, 64, 65, 42, and 43 of the embodiment depicted in Fig. 1. As readily seen in Fig. 1 nodes 40 and 41 are in the first stage of the network, nodes 64 and 65 the second stage, and nodes 42 and 43 the third stage; the additional nodes of these and other stages are not depicted in Fig. 6, but it is apparent to those skilled in the art wherein they may also be connected to the alternating current generator 95. Each of the nodes of the first group of alternate stages is connected to one terminal of the generator circuit to have an alternating current of one phase applied thereto, and each of the nodes of the other group of alternate stages is connected to the other terminal to have an alternating current of a second phase applied thereto. Specifically in the embodiment depicted in Fig. 6, each of the nodes is connected to one or the other terminal of the generator circuit and specifically to one or the other terminal of an output transformer 96 by individual switching circuits employing the gas discharge device 50 to close the alternating current path from the transformer to the nodes through condensers 52 and 48; elements in Fig. 6 employed similarly as those in Fig. 1 are identified by the same reference numeral. The direct current marking potential is supplied through individual switches 60 and resistors 54 and 47 to each of the nodes, while the sustain potential for tubes 50 is supplied through individual switches 62 and resistors 56. The center tap of the secondary of transformer 96 is grounded to complete the direct current path for the sustain voltage applied to tubes 50. The operation of this embodiment is the same as that disclosed in Figs. 1 and 2 in that the switches 60 and 62 are simultaneously moved to their mark position. Ionization of the crosspoints causes a pulse to be transmitted through condensers 52 sufficient to raise tubes 50 to their ionization value, thus closing the circuit between the alternating current source and the several marked nodes.

While various embodiments of this invention have been depicted in which direct current marking and alternating current latching of the nodes of a switching network are attained, it is to be understood that this invention is not to be considered as limited to these particular embodiments. Instead the above-described arrangements are to be considered as illustrative of the application of the principles of the invention. Numerous other arrangements may be devised by those skilled in the art without departing from the spirit and scope of the invention.

What is claimed is:

1. In a communication switching circuit, a plurality of input lines, a plurality of output lines, and means defining paths between said input and output lines, said means including a gas discharge device crosspoint switch having a plurality of nodes and a plurality of gas discharge devices therein, direct current means for applying a marking potential to said nodes and alternating current means coupled to said nodes for maintaining selected gas discharge devices in a marked condition.

2. In a communication switching circuit, the combination according to claim 1 wherein said alternating current means comprises generator means coupled to a first group of alternate nodes and having a first output frequency and generator means coupled to the other group of alternate nodes and having a second output frequency.

3. In a communication switching circuit, the combination according to claim 1 wherein said alternating current means comprises generator means coupled to a first group of alternate nodes applying alternating current of one phase thereto and coupled to a second group of alternate nodes applying alternating current of a different phase thereto.

4. In a communication switching circuit, the combination according to claim 1 wherein said alternating current means comprises a grounded generator means coupled to first alternate nodes and condensers connecting second alternate nodes to ground.

5. In a communication switching circuit, the combination according to claim 1 wherein said alternating current means comprises generator means having an output period which is less than twice the deionizing time of said gas discharge devices.

6. In a communication switching circuit, a plurality of input lines, a plurality of output lines, and means defining paths between said input and output lines, said means including a crosspoint switch having a plurality of gas discharge devices and a plurality of nodes therein, direct current means for applying a marking potential to said nodes, alternating current means coupled to said nodes for maintaining selected gas discharge devices in a marked condition, and means responsive to ionization of said selected gas discharge devices for applying the output from said alternating current means to said nodes.

7. In a communication switching circuit, the combination according to claim 6 wherein said alternating current means comprises generator means having a first output frequency and coupled to a first group of alternate nodes and generator means having a second output frequency and coupled to the other group of alternate nodes.

8. In a communication switching circuit, the combination according to claim 6 wherein said alternating current means comprises generator means coupled to a first group of alternate nodes applying alternating current of one phase thereto and coupled to a second group of alternate nodes applying alternating current of a different phase thereto.

9. In a communication switching circuit, the combination according to claim 6 wherein said alternating current means comprises a common generator having a first and a second output terminal, said first terminal coupled to first alternate nodes and said second terminal coupled to second alternate nodes.

10. A communication switching network comprising a plurality of gaseous discharge devices defining multiple paths through the network, means for applying marking potentials to said devices to mark said devices, and means for maintaining the marked devices in an ionized state with a direct current therethrough, said current being of insufficient value to maintain ionization in said marked devices, said last-mentioned means including means for applying an alternating current voltage to said marked devices.

11. A communication switching network comprising a plurality of input terminals, a plurality of output terminals, a plurality of gaseous discharge devices interconnected between said input and output terminals to define multiple paths therebetween, means for applying marking potentials to said devices to effect establishment of a path between one of said input and one of said output terminals, and alternating current means for maintaining said marked devices in an ionized state before the establishment of said path.

12. A communication system in accordance with claim 11 wherein said alternating current means includes means for applying alternating current potentials across said devices to establish discharges in said devices periodically, said discharges occurring repetitiously at a rate faster than the deionizing time of said gas discharge devices.

13. In a communication switching circuit, a plurality of input lines, a plurality of output lines, and means defining paths between said input and output lines, said means including a crosspoint switching network having gas discharge crosspoint devices, means applying direct current marking signals to said network for ionizing certain of said crosspoints, and relay means responsive to said marking signals for applying alternating current to said crosspoints to maintain said crosspoints ionized.

14. In a communication switching circuit, the combination in accordance with claim 13 wherein said relay means applies alternating current to only one side of each of said crosspoints.

15. In a communication switching circuit, a plurality of input lines, a plurality of output lines, and means defining paths between said input and output lines, said means including a crosspoint switch having a plurality of nodes and a plurality of gas discharge devices therein, direct current means including electron discharge devices connected between a marking bias source and certain of said nodes for applying a marking potential to said nodes, and alternating current means comprising oscillator circuits including said electron discharge devices coupled to said nodes for maintaining selected gas discharge devices in a marked condition.

16. In a communication switching circuit, the combination according to claim 15 wherein certain of said oscillator circuits are connected to a first group of alternate nodes and have a first output frequency and the remainder of said oscillator circuits are connected to the other alternate nodes and have a second output frequency.

17. In a communication switching circuit in accordance with claim 16, the period of each of said output frequencies being less than twice the deionization time of said gas discharge crosspoints.

18. In a communication switching circuit, a plurality of input and output lines and means for selectively defining paths between predetermined pairs of said lines, said means including a crosspoint switch having a plurality of nodes and a plurality of gas discharge crosspoints therein, direct current means for applying a marking potential to said nodes, alternating current generator means, phase separation means connected to said generator means, and gas discharge devices coupled between said phase separation means and said nodes and adapted to be ionized by the application of a direct current pulse to said nodes whereby different output phases of said alternating current generator means are applied to alternate ones of said nodes in response to the ionization of crosspoints to said nodes.

19. In a communication switching circuit, a plurality of input lines, a plurality of output lines, means defining paths between said input and said output lines, said means including a gas discharge device crosspoint switch having a plurality of nodes therein, direct current means for applying marking potential to said nodes, said direct current means including means for applying a reduced direct current potential subsequent to the application of marking potential to said nodes and alternating current means coupled to said nodes for combining an alternating electromotive force with said reduced direct current potential to latch selected gas discharge devices in a marked condition.

20. In a communication switching circuit in accordance with claim 19, said direct current means including means for applying a direct current potential having a magnitude less than the sustain potential of the crosspoint devices subsequent to the application of marking potential to said nodes.

References Cited in the file of this patent

UNITED STATES PATENTS

| | | |
|---|---|---|
| 1,545,025 | Anspach | July 7, 1925 |
| 2,688,661 | Van Mierlo | Sept. 7, 1954 |
| 2,722,567 | Davison | Nov. 1, 1955 |